United States Patent
Betawadkar-Norwood et al.

(10) Patent No.: US 11,341,134 B2
(45) Date of Patent: *May 24, 2022

(54) APPARATUS AND METHOD FOR ACCELERATED QUERY PROCESSING USING EAGER AGGREGATION AND ANALYTICAL VIEW MATCHING

(71) Applicant: Cloudera, Inc., Palo Alto, CA (US)

(72) Inventors: Anjali Betawadkar-Norwood, Campbell, CA (US); Priyank Patel, Fremont, CA (US)

(73) Assignee: Cloudera, Inc., Palo Alto, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/989,687

(22) Filed: Aug. 10, 2020

(65) Prior Publication Data

US 2020/0372029 A1  Nov. 26, 2020

Related U.S. Application Data

(63) Continuation of application No. 16/020,835, filed on Jun. 27, 2018, now Pat. No. 10,740,333.

(51) Int. Cl.
*G06F 16/2453* (2019.01)
*G06F 16/2458* (2019.01)
*G06F 16/27* (2019.01)

(52) U.S. Cl.
CPC .... *G06F 16/24542* (2019.01); *G06F 16/2458* (2019.01); *G06F 16/27* (2019.01)

(58) Field of Classification Search
CPC .......... G06F 16/24542; G06F 16/2458; G06F 16/27; G06F 16/273; G06F 16/275; G06F 16/278
See application file for complete search history.

(56) References Cited

U.S. PATENT DOCUMENTS

| | | | |
|---|---|---|---|
| 7,315,849 B2 * | 1/2008 | Bakalash | G06F 16/2455 |
| 7,392,248 B2 * | 6/2008 | Bakalash | C03B 37/02718 |
| 8,041,670 B2 * | 10/2011 | Bakalash | G06F 16/283 707/603 |
| 9,740,741 B2 * | 8/2017 | Plattner | G06F 16/24552 |
| 10,120,898 B1 * | 11/2018 | Betawadkar-Norwood | G06F 16/24535 |
| 10,120,902 B2 * | 11/2018 | Erdogan | G06F 16/24544 |
| 2009/0292714 A1 * | 11/2009 | Han | G06F 16/9024 |

* cited by examiner

*Primary Examiner* — Jorge A Casanova
(74) *Attorney, Agent, or Firm* — Staniford Tomita LLP

(57) ABSTRACT

A system comprises a computer network and worker machines connected to the computer network. The worker machines store partitions of a distributed database. A master machine is connected to the computer network. The master machine includes a query processor to identify a star query that references a fact table and related dimension tables that characterize attributes of facts in the fact table. Eager aggregation is applied to a query plan associated with the star query. The eager aggregation alters the query plan by moving an aggregation operation before a join operation to form an eager aggregated query plan. An analytical view with data responsive to the eager aggregated query plan is identified. The eager aggregated query plan is revised to form a final query plan. The final query plan references the analytical view. The final query plan is executed to produce query results.

20 Claims, 9 Drawing Sheets

APPARATUS AND METHOD FOR ACCELERATED QUERY PROCESSING USING EAGER AGGREGATION AND ANALYTICAL VIEW MATCHING

CROSS-REFERENCE TO RELATED APPLICATIONS

This application is a Continuation of U.S. application Ser. No. 16/020,835 filed Jun. 27, 2018, and entitled "Apparatus and Method for Accelerated Query Processing Using Eager Aggregation and Analytical View Matching."

FIELD OF THE INVENTION

This invention relates generally to processing of data in a distributed database. More particularly, this invention relates to techniques for accelerating query processing by using eager aggregation and analytical view matching.

BACKGROUND OF THE INVENTION

A distributed database is a database in which storage devices are not all attached to a common processing unit, such as a central processing unit. Instead, multiple computers are used to implement a distributed database management system. The multiple computers may be located in the same physical location, or they may be dispersed over a network of disaggregated interconnected computers. There is typically a master node and a set of slave or worker nodes that store partitions of the distributed database.

Distributed databases are commonly used to support Business Intelligence applications. Business Intelligence data is typically modeled using a star or a snowflake schema where fact table(s) keep track of facts, such as itemized sales. Dimensions describe attributes of the facts, e.g., a 'customer' dimension table describes the details of the customer, a 'store' dimension table describes stores etc. Fact tables are typically wide tables with a large number of columns and rows. Dimension tables are typically smaller in size.

The star schema gets its name from the physical model's resemblance to a star shape with a fact table at its center and the dimension tables surrounding it representing the star's points. FIG. 1 is an example of a star schema with a fact table in the center and eight different dimension tables surrounding the fact table. FIG. 2 illustrates a specific star schema with a fact table named "sales' in the middle and dimension tables respectively named "Products", "Customers", "Promotions", "Period" and "Stores" surrounding the fact table.

In order to create a normalized schema, dimension tables have a primary key which relates to a foreign key in a fact table. For example, a store dimension has a primary key 's_store_sk' that relates to the foreign key 'ss_store_sk' in a sales fact table. This relationship is defined in a database using a primary-foreign key constraint (pk-fk constraint) or a referential integrity (RI) constraint. The pk-fk relationships are hard to maintain in distributed environments when the fact tables and dimension tables are periodically updated with data.

Some database systems use 'informational' constraints to allow the databases to perform certain optimizations assuming the pk-fk holds and leaving the integrity of the system to be enforced by the user.

In a Structured Query Language (SQL) query, the fact table foreign key equi-joins with the dimension's primary key. The pk-fk constraint or referential constraint guarantees that the 'pk' is unique in the dimension table and it uniquely determines other attributes in the dimension table. For example, product_id in a products table uniquely determines product name and product description. The existence of a foreign key guarantees that a row in the fact table with product id say, 'pid1', will necessarily find one exact matching row in the dimension table 'product' with product id of 'pid1'. There may be multiple rows in the fact table with the same product id.

FIG. 3 is an example of a snowflake schema with a fact table in the center, surrounded by dimension tables, which are surrounded by additional tables. Reference herein to a star schema also implicates a snowflake schema.

The Transaction Processing Performance Council (TPC) has established a Decision Support (DS) benchmark known as TPC-DS. FIG. 4 illustrates a TPC-DS benchmark snowflake schema.

FIG. 5 illustrates a schema that supports fact table to fact table joins. A typical fact-to-fact join involves each fact table aggregating its own measures and joining with its sets of dimensions and then these aggregated fact tables are joined with each other, typically using common dimensions.

Queries based on star or snowflake schema are notoriously expensive to compute for two reasons. First, the amount of data in fact tables is typically huge. Second, since the queries join on the primary-foreign keys, the joins are not reducing. That is, the number of rows in the result of the query is the same as the number of rows in the fact table that survives local filtering on the fact table. This is unlike non-star-schema joins where in the majority of the cases, the number of rows in the result of the join is less than the number of the rows in the bigger of the tables.

Given the high concurrency that Business Intelligence applications demand—typically on the order of 100's to 1000s of concurrent sessions—it is not practical to pay the cost of computing these expensive joins upon every BI application (dashboard, visual) interaction. To alleviate this, BI systems rely on two core strategies. First, joins are pre-materialized to provide fast query response. The pre-materialization is sometimes called cubes or lenses or aggregate tables. Advantageously, pre-materialization pays the cost of the join once, so all BI dashboard-time queries can be executed against a single table. On the other hand, pre-materialization has a high initial cost of computation, which adds to a delay before the BI application can be used. This is typically called "cube building time", which adds latency to the application. Another problem is latency due to maintenance. If new data is added to any underlying table, typically the cube needs a re-computation. If a user finds that a cube does not model the necessary dimensions or measures, there is a further cost to modifying the definition of the cube and materializing it.

Another prior art technique to avoid the expense of joins is the caching of query results. This has the advantage of fast query time during the BI interactions. However, this is severely limited since query result caching does not address BI interactions like drill down, roll ups, and filters. Without that functionality a query result tier is not sufficient for BI applications to be used in a production setting.

In view of the foregoing, there is a need for improved techniques for executing joins for star and snowflake schema in big data applications.

SUMMARY OF THE INVENTION

A system comprises a computer network and worker machines connected to the computer network. The worker machines store partitions of a distributed database. A master machine is connected to the computer network. The master machine includes a query processor to identify a star query that references a fact table and related dimension tables that characterize attributes of facts in the fact table. Eager aggregation is applied to a query plan associated with the star query. The eager aggregation alters the query plan by moving an aggregation operation before a join operation to form an eager aggregated query plan. An analytical view with data responsive to the eager aggregated query plan is identified. The analytical view includes attributes and measures maintained as a data unit separate from the distributed database. The analytical view is constructed prior to receipt of the star query. The eager aggregated query plan is revised to form a final query plan. The final query plan references an analytical view. The final query plan is executed to produce query results.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

Figure 1:
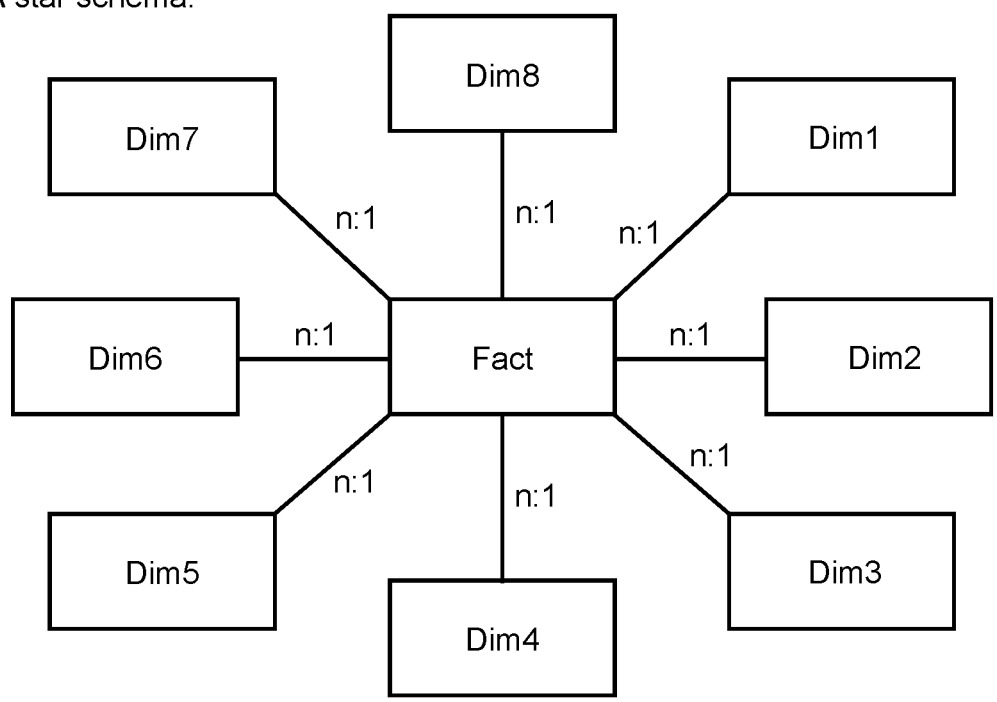
FIG. 1 is a general depiction of a prior art star schema.
Figure 2:
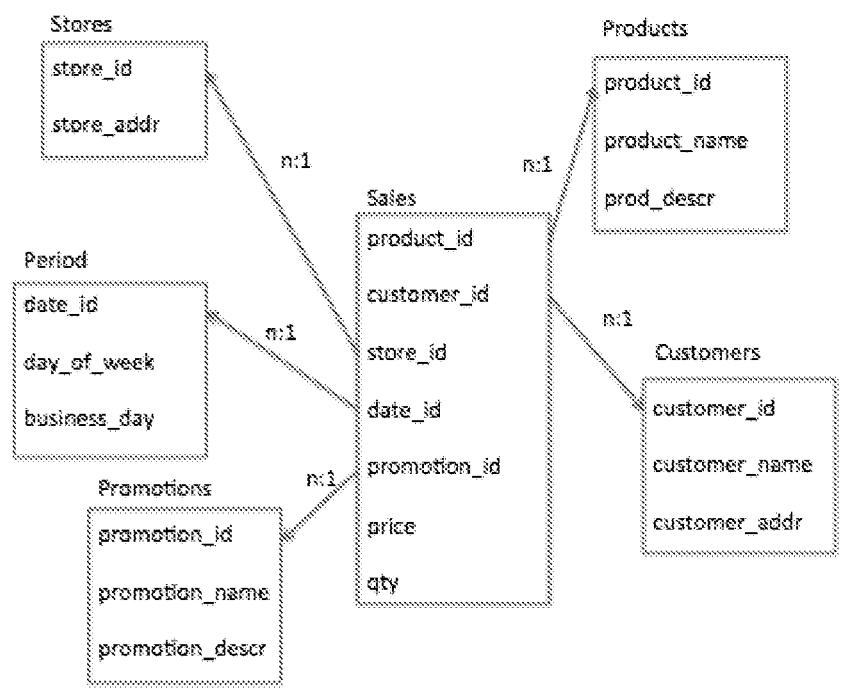
FIG. 2 is a specific depiction of a prior art star schema.
Figure 3:
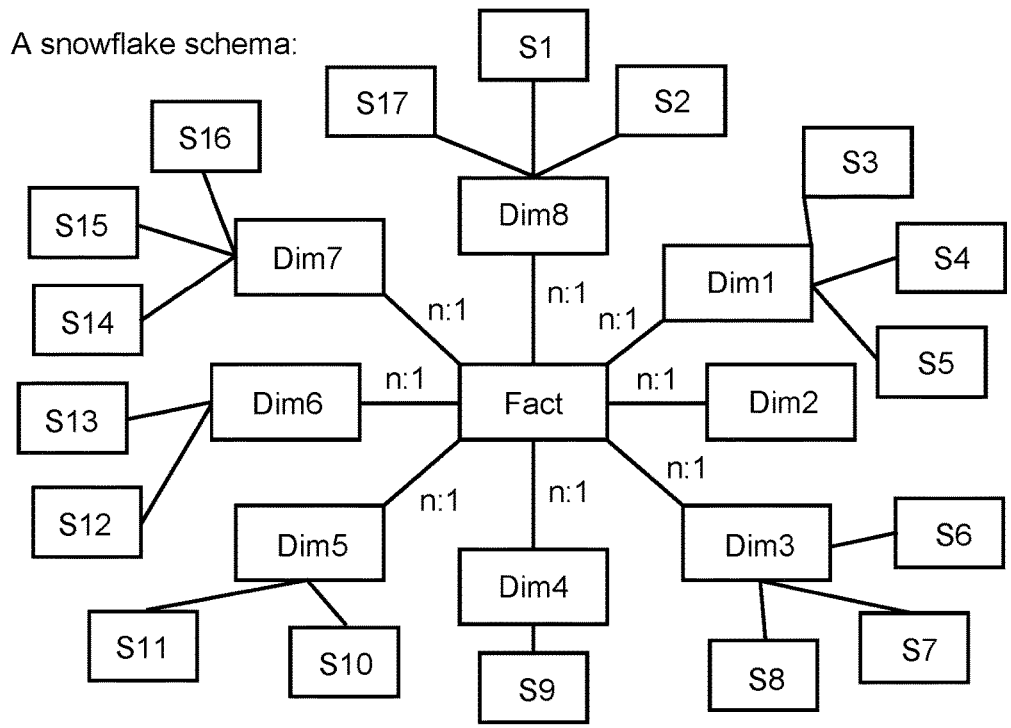
FIG. 3 is an example of a prior art snowflake schema.
Figure 4:
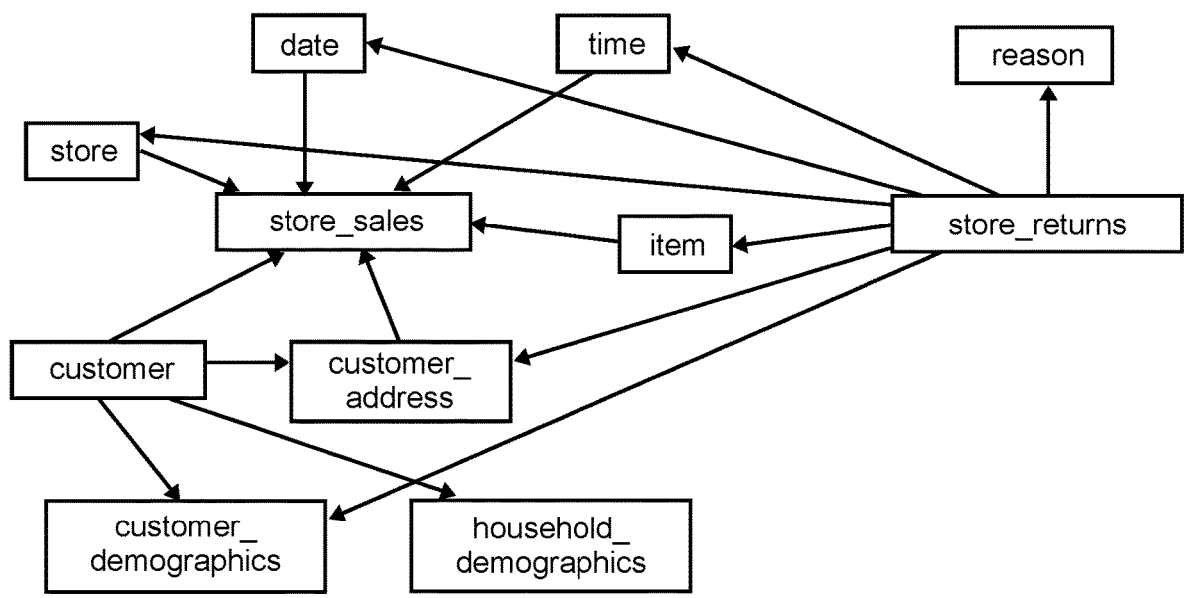
FIG. 4 is an example of a prior art TPC-DS benchmark snowflake schema.
Figure 5:
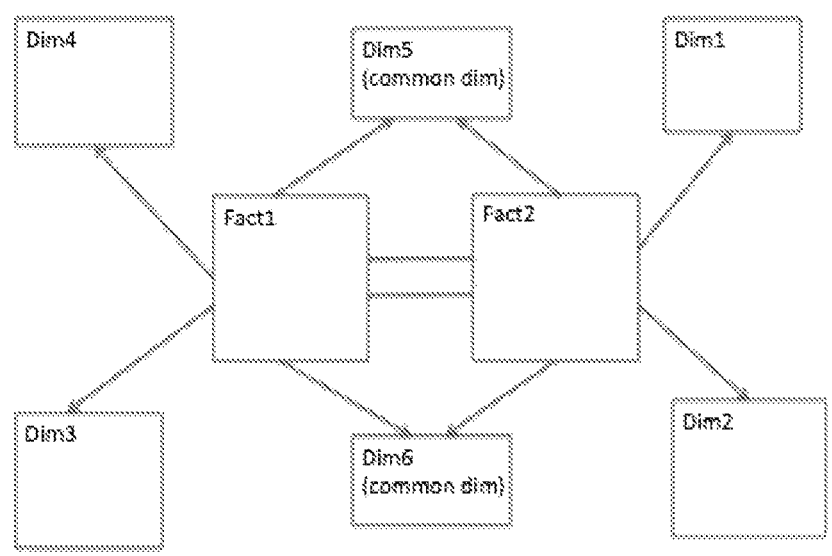
FIG. 5 illustrates a prior art schema for fact table to fact table joins.
Figure 6:
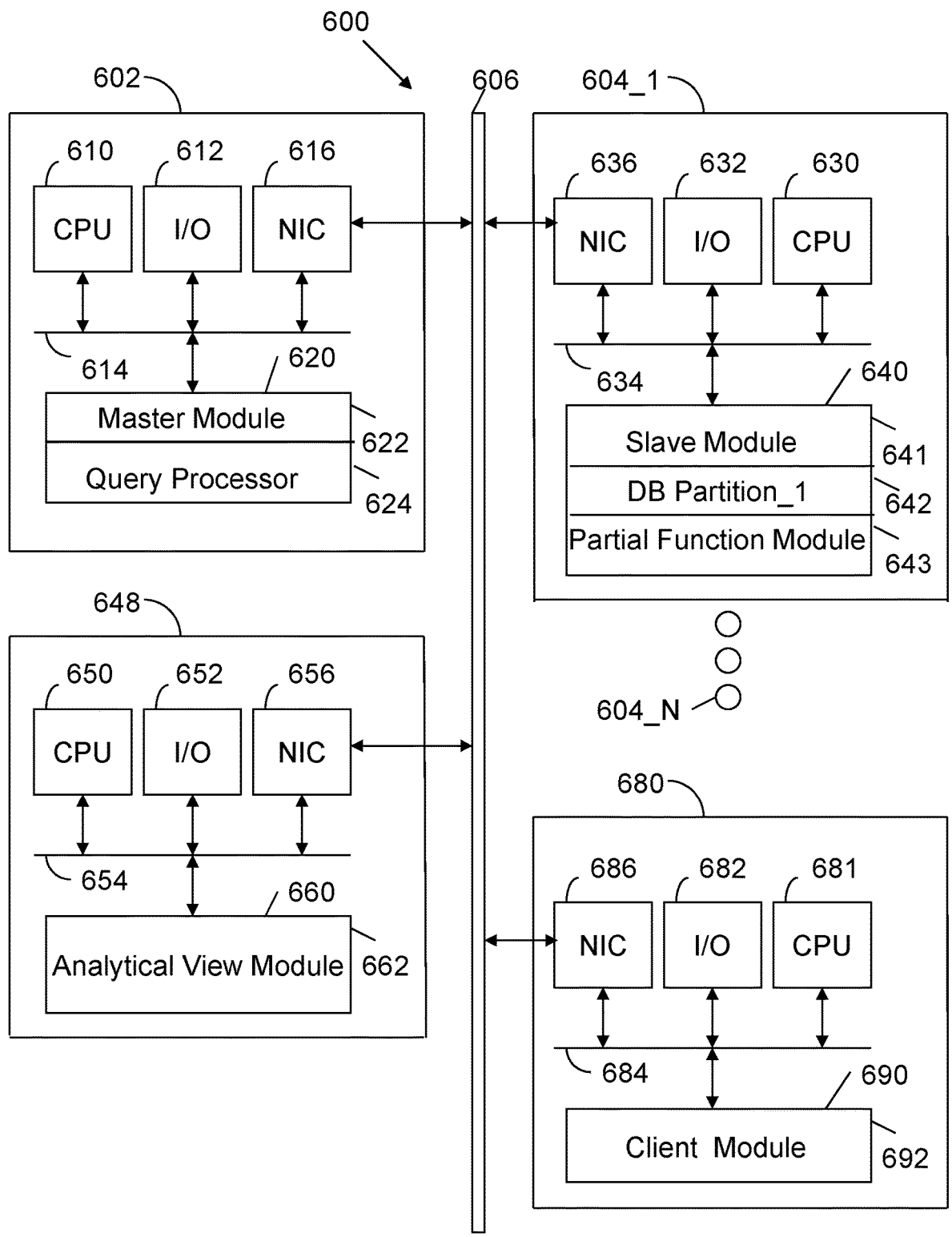
FIG. 6 illustrates a system configured in accordance with an embodiment of the invention.

FIG. 6 illustrates a system 600 configured in accordance with an embodiment of the invention. The system implements a distributed database across a master machine 602 and a set of worker or slave machines 604_1 through 604_N, which communicate via a network 606, which may be any combination of wired and wireless networks. The master machine 602 includes standard components, such as a central processing unit 610 and input/output devices 612 connected via a bus 614. The input/output devices 612 may include a keyboard, mouse, touch display and the like. A network interface circuit 616 is also connected to the bus 614 and provides connectivity to network 606. A memory 620 is also connected to the bus 614. The memory 620 includes instructions executed by the central processing unit 610. In particular, the memory 620 stores a master module 622, which includes executable instructions to perform master node operations associated with a distributed database. The memory 620 also stores a query processor 624, which coordinates processing of queries across the slave machines 604_1 through 604_N. The query processor 624 derives a query execution plan in accordance with the techniques disclosed herein. In particular, the query processor 624 implements a query plan that utilizes eager aggregation and analytical view matching, as described below.

Each worker machine (e.g., 604_1) also includes standard components, such as a central processing unit 630, input/output devices 632, a bus 634, a network interface circuit 636 and a memory 640. The memory 640 stores a slave module 641 to implement slave processing at the direction of the master machine 602. The memory 640 also stores at least one database partition 642 of a distributed database. In addition, the memory 640 stores a partial function module 643. The partial function module 643 includes executable instructions to initialize a database dimension, then update a change in an aggregate of the database dimension and then serialize (i.e., communicate to another node) the last aggregate. The partial function module 643 also merges and finalizes partial results for each dimension processed in accordance with the invention. Operations of the partial function module 643 are fully detailed in U.S. patent application Ser. No. 15/230,261, filed Aug. 5, 2016, the contents of which are incorporated herein by reference.

analytical view machine 648 may also be connected to network 606. The analytical view machine 648 also includes standard components, such as a central processing unit 650, input/output devices 652, a bus 654, a network interface circuit 656 and a memory 660. The memory 660 stores an analytical view module 662. The analytical view module 662 includes instructions executed by the central processing unit 650 to implement operations disclosed herein.

An analytical view is a subset of data from a table or multiple tables. The analytical view may be computed by applying joins, unions, applying filters or other Structured Query Language (SQL) operations to the table or tables. The analytical view typically comprises dimensions and measures, although either dimensions or measures may be absent. The analytical view may comprise an attribute (e.g., a column name or dimension) and a measure (e.g., an aggregate, such as sum, min, max) that is defined prior to the receipt of a query and is maintained as a data unit separate from the table. An attribute can be a dimension or a measure. When data is grouped along an attribute, it becomes a dimension. When data is aggregated on an attribute, it becomes a measure. For example, in the case of the request for 'sum(amt) by product_id', product_id and amt are both attributes in the table. Product_id is used as a dimension and amt is used as a measure. The analytical view exposes a dimension 'product_id' and an aggregate 'sum(amt)'.

The query processor 624 uses analytical views to expedite query processing. Analytical views typically materialize (e.g., cache) data resulting from computations frequently needed by queries. When a database system can prove that, semantically, it is correct to answer the query using the data in an analytical view, the system uses the pre-aggregated data from the analytical view to save processor and input/output bandwidth. This results in expedited processing of the query. While cubes are viewed as a separate resource that can be independently queried by a user, analytical views are not a separate resource for a user that can be independently queried. Rather, an analytical view is a resource for the query processor 624 to more efficiently process a query. The analytical view module 662 may be resident on master machine 602.

FIG. 6 also illustrates a client machine 680 connected to network 606. The client machine 680 includes standard components, such as a central processing unit 681, input/output devices 682, a bus 684, a network interface circuit 686 and a memory 690. The memory 690 stores a client module 692, which allows the client machine to pass queries to the master machine 602, which processes such queries in accordance with the techniques disclosed herein.

Figure 7:
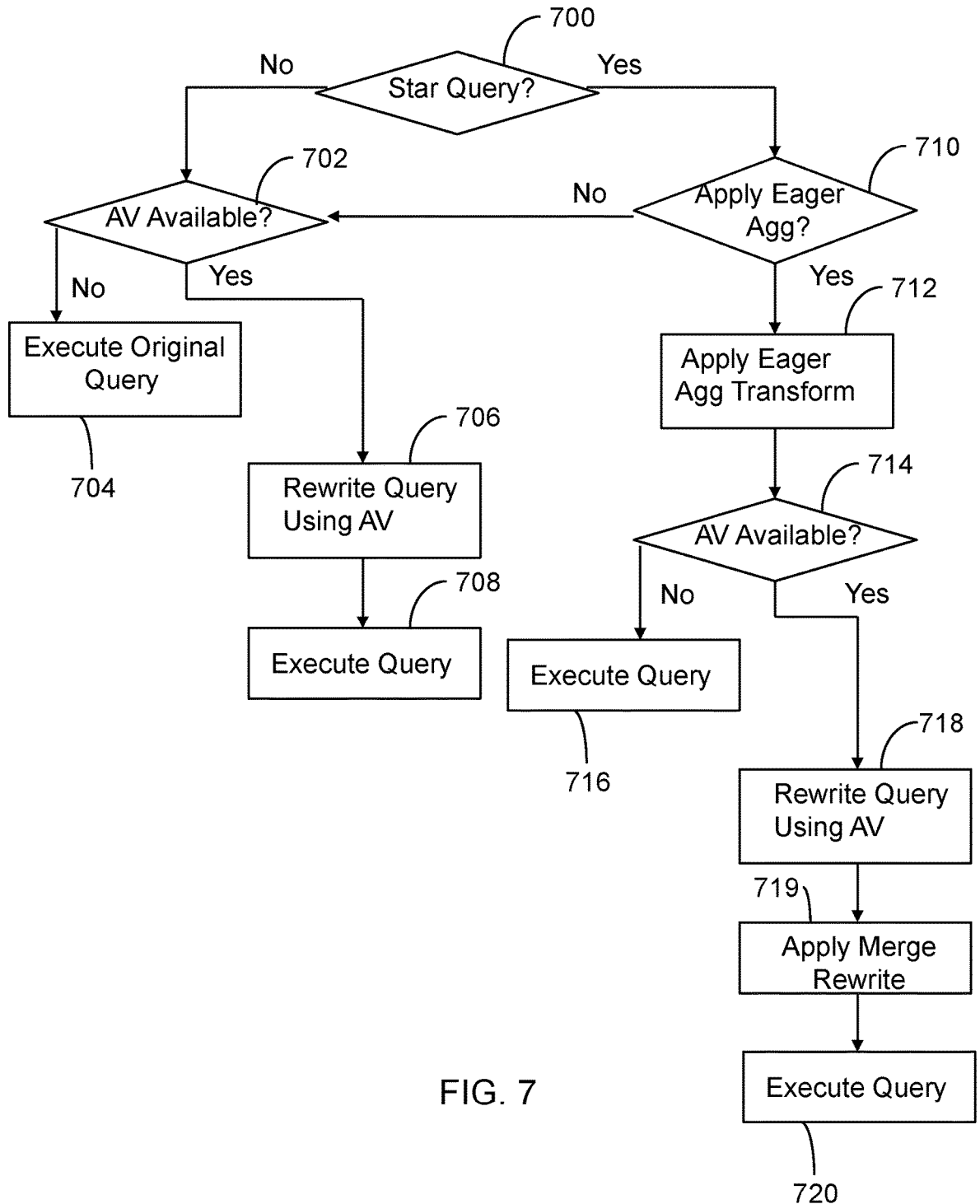
FIG. 7 illustrates query processing performed in accordance with an embodiment of the invention.

FIG. 7 illustrates processing operations performed by the query processor 624. The query processor 624 determines whether a received query is a star query 700. For example, the query processor 624 receives the query from network 606, where the query was initiated by client machine 680. If a star query is not received (700—No), then query processor 624 attempts to leverage an analytical view to improve performance or otherwise performs standard query processing. More particularly, it is determined whether an analytical view is available 702. If not (702—No), the original query is executed in a standard manner 704. If an analytical view is available (702—Yes), the query is re-written using the analytical view 706 and then the query is executed 708.

If a star (or snowflake) query is implicated (700—Yes), then it is determined whether eager aggregation is applicable to the query 710. If not (710—No), processing proceeds to block 702. If so (710—Yes), an eager aggregation transform is applied to the query 712. Eager aggregation refers to a query plan in which an aggregation operation (e.g., a group-by operation) is moved in front of a join operation in a query plan. Eager aggregation reduces the number of input rows to the join and thus typically results in a better query plan. Eager aggregation stands in contrast to lazy aggregation where an aggregation operation (e.g., a group-by operation) is delayed until after a join operation. The delayed group-by operation is combined with another group-by operation.

It is then determined whether an analytical view is available for the query 714. If not (714—No), the query is executed 716 and enjoys processing benefits stemming from the eager aggregation transform. If an analytical view is available (714), then the query is rewritten using the analytical view 718.

Next, merge rewrite is applied 719. That is, the query is transformed using a merge rewrite that merges together the select blocks introduced by the eager aggregation rewrite. Flattening the query out in this manner allows the query to benefit from other optimizations.

Finally, the query is executed 720. Typically, the query is executed by worker machines 604_1 through 604_N with results being merged by the query processor 624 on the master machine 602. The results are then supplied to the client machine 680. The query processor 624 may interact with the analytical view module 662 of machine 648. Alternately, the analytical view module 662 may be incorporated into machine 602.

Observe that the query essentially receives two processing enhancements in this instance. One enhancement is attributable to the eager aggregation transform and the second enhancement is attributable to the utilization of the analytical view. Thus, the disclosed technique results in more efficient utilization of computation resources and improved memory utilization. The utilization of the analytical view reduces network traffic. The partial function module 643 provides incremental updates to an analytical view, which is more efficient than cube reconstruction. Thus, the disclosed technique supports agile BI operations that are not available in the prior art.

Thus, the evaluation of a business intelligence dashboard time query is accelerated by making its computation incremental and by computing joins on partially aggregated analytical views. As previously indicated, computing joins on partially aggregated analytical views is disclosed in a patent application owned by the assignee of the current patent application, which is assigned Ser. No. 15/230,261 and is entitled "Apparatus and Method for Allowing Complex Aggregates in Analytical Views in a Distributed Database", filed Aug. 5, 2016, the contents of which are incorporated herein by reference. This reduces the query computation expense and allows for queries to be computed live at a business intelligence dashboard. The disclosed technique also facilitates incremental maintenance operations because the partially aggregated analytical views can be incrementally computed as new data is added to the fact tables. Another advantage of the disclosed technique is business intelligence application agility in modifying dimensions and measures without re-computing an entire join, which results from additions appearing as partial computations of analytical views on fact tables. The disclosed technique lends itself to other schemas like snowflake schema and fact to fact joins equally well.

The invention can be also be characterized in the following ways. An embodiment of the invention implements a database rewrite that pushes down aggregation and grouping to a fact table through the join. The idea is to group and aggregate early to reduce the number of rows that will participate in the joins. Such a rewrite transforms the query to a form that allows the use of an analytical view that aggregates on the fact table. Such an analytical view can be built in an incremental fashion since it is based on a single table.

An embodiment of the invention performs a merge rewrite to flatten out the statement to take advantage of other database optimizations afforded by a simple flat join, for example, pushing down join predicates between the dimension and the fact table onto the fact table by sending qualifying dimension table join key values as bit maps to pre-filter the fact table.

The following text describes a specific example of the query processing described in FIG. 7. Most database systems support creation of primary-foreign key constraints using fancy syntax. A trivial way to communicate the primary-foreign key relationship to the database system is through setting properties of the tables. For example, the following statement declares 'pk1' column to be the primary key of the 'dim1' table that resides in 'stardb' database and this primary key holds the relationship with the column 'f1' in the 'fact' table residing in 'stardb' database.

```
alter table stardb.fact set
tblproperties('fkey_stardb.fact.f1'='pkey_stardb.dim1.pk1');
```

A similar definition for TPC-DS schema follows.

```
alter table tpcds_parquet.store_sales set
tblproperties('fkey_tpcds_parquet.store_sales.ss_sold_date_sk'='pkey_tpc
ds_parquet.date_dim.d_date_sk',
'fkey_tpcds_parquet.store_sales.ss_sold_time_sk'='pkey_tpcds_parquet.tim
e_dim.t_time_sk',
'fkey_tpcds_parquet.store_sales.ss_item_sk'='pkey_tpcds_parquet.item.i_i
tem_sk',
'fkey_tpcds_parquet.store_sales.ss_customer_sk'='pkey_tpcds_parquet.cust
omer.c_customer_sk',
'fkey_tpcds_parquet.store_sales.ss_cdemo_sk'='pkey_tpcsds.customer_demog
raphics.cd_demo_sk',
'fkey_tpcds_parquet.store_sales.ss_hdemo_sk'='pkey_tpcds_parquet.househo
ld_demographics.hd_demo_sk',
'fkey_tpcds_parquet.store sales.ss_addr_sk'='pkey_tpcds_parquet.customer
_address.ca_address_sk',
'fkey_tpcds_parquet.store_sales.ss_store_sk'='pkey_tpcds_parquet.store.s
_store_sk',
'fkey_tpcds_parquet.store_sales.ss_promo_sk'='pkey_tpcds_parquet.et_prom
otion.p_promo_sk');
```

Figure 8:
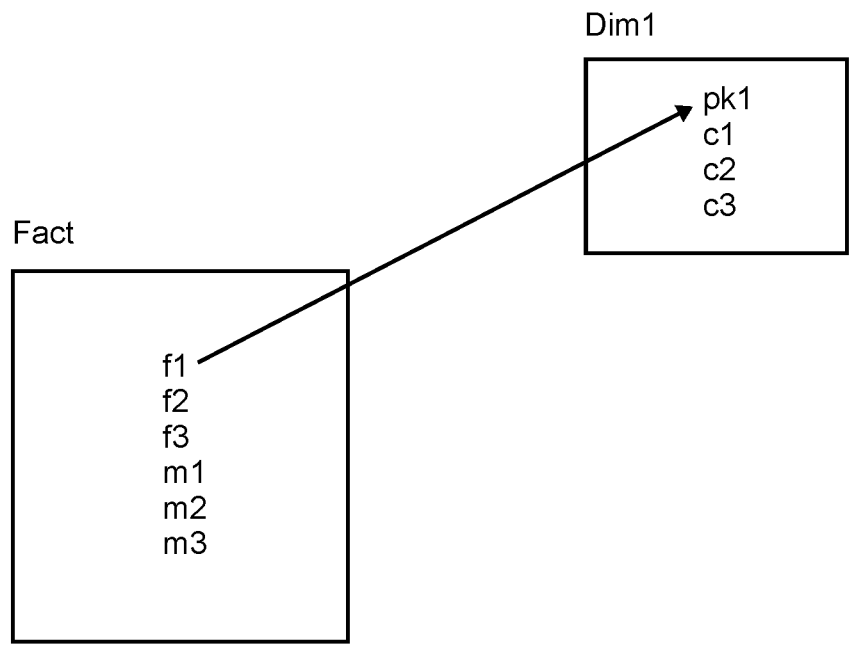
FIG. 8 illustrates a star schema processed in accordance with an embodiment of the invention.

FIG. 8 illustrates a very simple star schema with a fact table and a dimension table. A query on the schema of FIG. 8 follows.

```
=> f1 is the foreign key that holds referential integrity with
   pk1 primary key of the dimension dim1
   create table fact(f1 int, f2 int, f3 int, m1 int, m2 double, m3
   string); create table dim1(pk1 int, c1 int, c2 double, c3 string);
=> Query:
   select sum(m1), dim1.c2,
   dim1.c3 from fact, dim1
   where
   f1=pk1
   group by 2,
   3;
```

Figure 9:
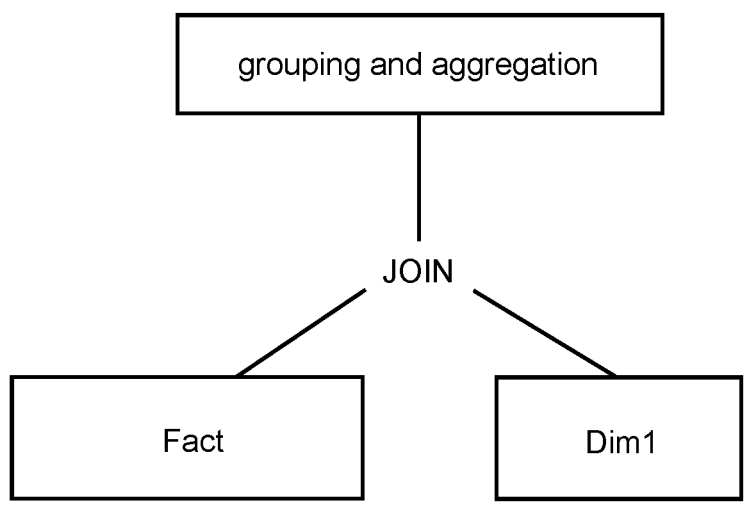
FIG. 9 is a graphical characterization of an inefficient execution plan.

The query is executed as follows. Individual tables, fact and dim1 are read while applying any applicable local filters. Filtered tables are then joined using the join predicates. Joined results are grouped and aggregates are computed. The execution plan is graphically shown in FIG. 9.

An example query against the TPC-DS schema characterized above is set forth below.

```
SELECT     ss_ticket_number
           ,
           ss_customer_sk,
           ss_addr_sk,
           ca_city
                     bought_city
           , Sum(ss_coupon_amt) amt,
           Sum(ss_net_profit) profit
FROM       store_sales,
           date_dim
           , store,
           household_demographics
           , customer_address
WHERE      store_sales.ss_sold_date_sk =
           date_dim.d_date_sk AND store_sales.ss_store_sk
           = store.s_store_sk
           AND store_sales.ss_hdemo_sk =
           household_demographics.hd_demo_sk AND
           store_sales.ss_addr_sk =
           customer_address.ca_address_sk
           AND ( household_demographics.hd_dep_count = 5
```

-continued

```
           OR household_demographics.hd_vehicle_count =
           3
```

-continued

```
           ) AND date_dim.d_dow IN ( 6, 0 )
           AND date_dim.d_year IN ( 1999, 1999 + 1, 1999 + 2 )
           AND store.s_city IN ( 'Midway', 'Concord', 'Spring
Hill', 'Brownsville',
                                 'Greenville'
                               )
GROUP      BY ss_ticket_number,
           ss_customer_sk
           , ss_addr_sk,
           ca_city
```

Figure 10:
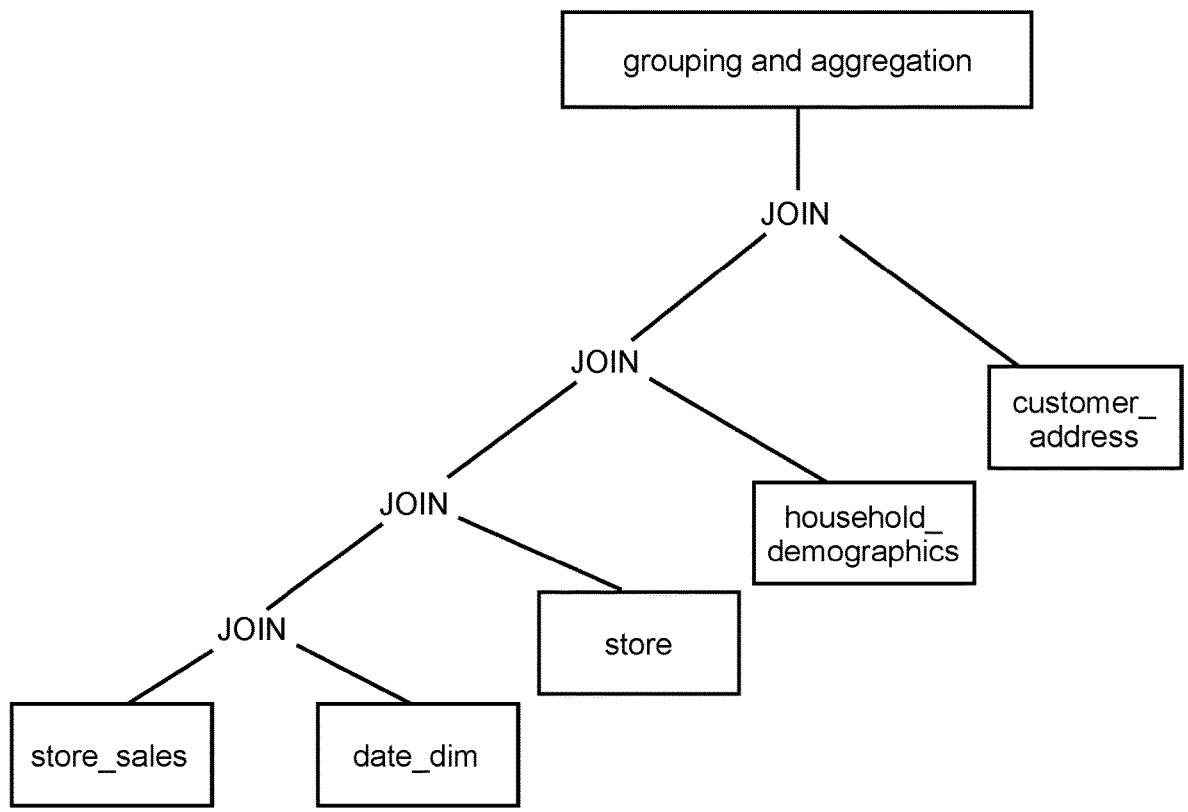
FIG. 10 is a graphical characterization of another inefficient execution plane.

The query is executed as follows. Initially, individual tables are read while applying applicable local filters, for example, the store table is read while filtering on the "s.city" column. Filtered tables are then joined using the join predicates. Joined results are then grouped and aggregates are computed. The execution plan is shown graphically in FIG. 10.

There are two inefficiencies with this approach. First, the join of "store sales" to other tables is a fact to dimensions join. It is a look up join that picks up attributes from dimensions corresponding to the join key, which makes the row wide without reducing the cardinality of the join result. Second, accelerating such a query requires the user to create a cube that performs the join of the fact table with dimensions followed by aggregation. In many cases, such a cube cannot be built incrementally.

Figure 11:
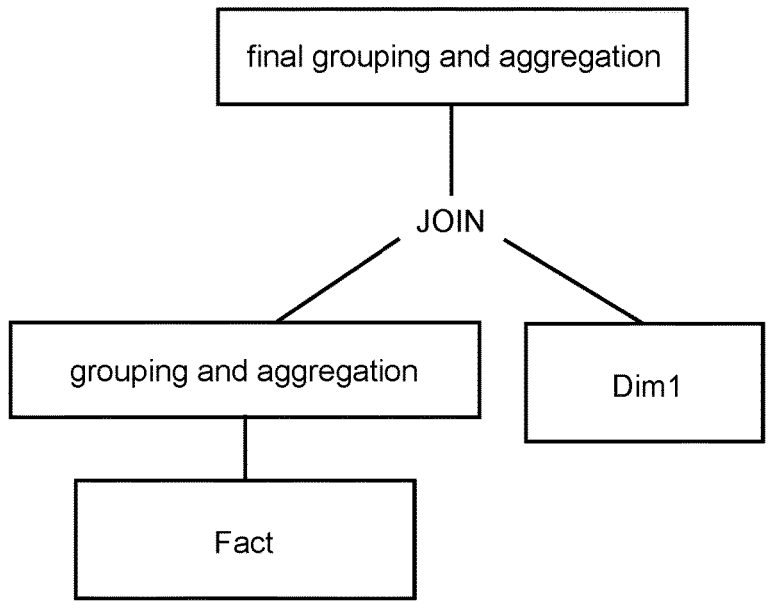
FIG. 11 is a graphical characterization of an execution plane implemented in accordance with an embodiment of the invention.

A solution to mitigate the two inefficiencies is to push grouping and aggregation through the joins and perform it on the fact table. The joins are performed after the aggregation to pick up the necessary attributes from the dimension tables. The graphical execution plan for the simpler query is shown in FIG. 11. Note that a final grouping and aggregation may be needed if the query groups on attributes from dimensions in addition to the attributes from the

```
SELECT     Sum('sum(m1)') 'sum(m1)',
           dim1.c2                        c2,
           dim1.c3                        c3
FROM       stardb.dim1,
           (SELECT Sum(m1) 'sum(m1)',
```

```
                    f1              f1
         FROM       stardb.fact
         GROUP      BY f1) aggregated fact
WHERE    f1 = pk1
GROUP    by 2,
         3
``` fact table. The rewritten and transformed query semantically looks as follows.

Figure 12:
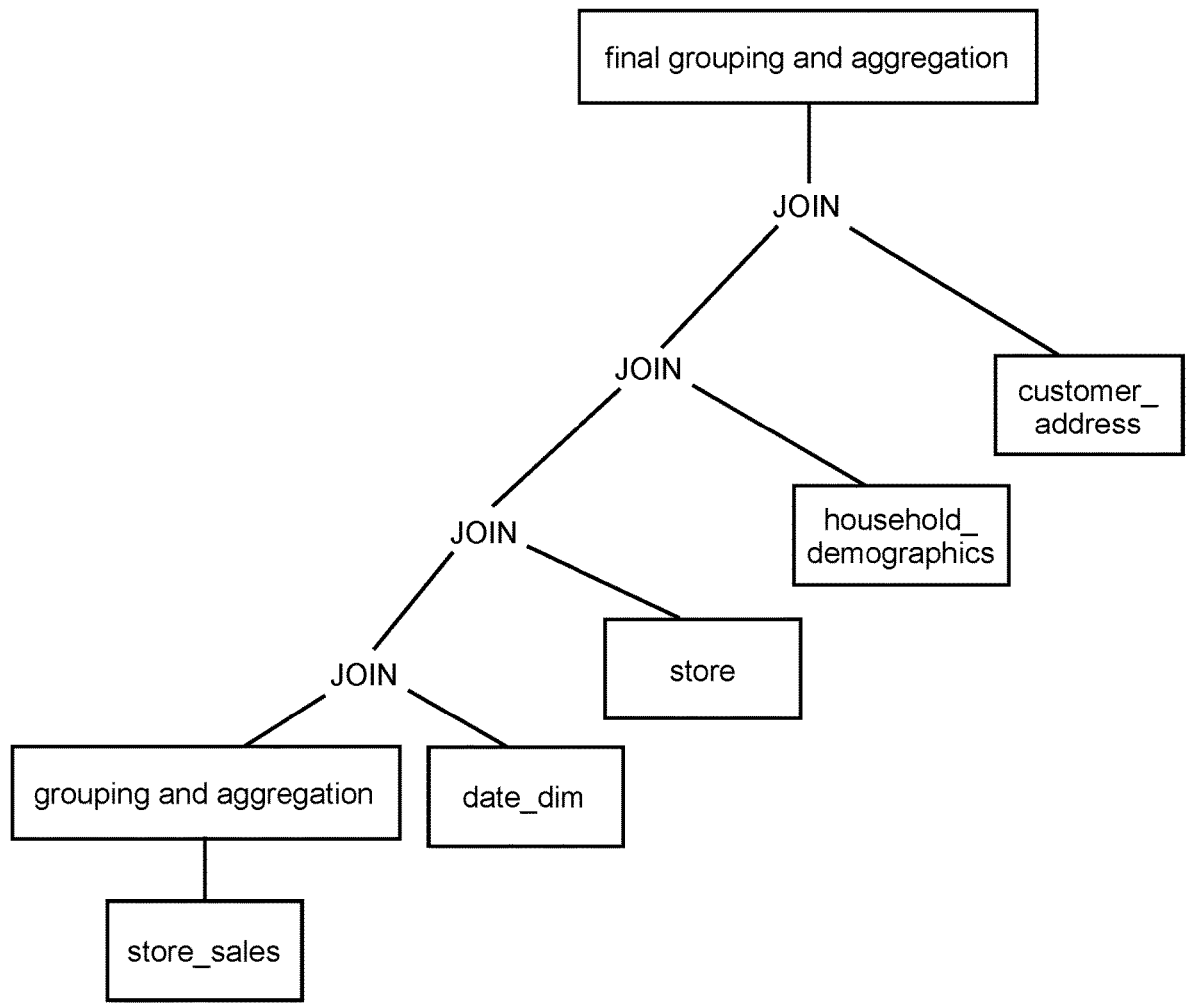
FIG. 12 is a graphical characterization of an execution plan for a TPC-DS query processed in accordance with an embodiment of the invention.
Like reference numerals refer to corresponding parts throughout the several views of the drawings.

The execution plan for this query is graphically shown in FIG. 12. The execution plan for the TPC-DS query is coded as follows.

SELECT_ss_ticket_number, ss_customer_sk, ss_addr_sk,

```
         ca_city                        bought_city,
         Sum('sum(ss_coupon_amt)')      amt,
         Sum('sum(ss_net_profit)')      profit
FROM     (SELECT ss_ticket_number,
                 ss_customer_sk,
                 ss_addr_sk,
                 Sum(ss_coupon_amt)             'sum(ss_coupon_amt)',
                 Sum(ss_net_profit)             'sum(ss_net_profit)',
                 store_sales.ss_sold_date_sk    'store_sales.ss_sold_date_sk',
                 store_sales.ss_store_sk        'store_sales.ss_store_sk',
                 store_sales.ss_hdemo_sk        'store_sales.ss_hdemo_sk'
         FROM    tpcds.store_sales
         GROUP   BY ss_ticket_number,
                 ss_customer_sk,
                 ss_addr_sk,
                 store_sales.ss_sold_date_sk,
                 store_sales.ss_store_sk,
                 store_sales.ss_hdemo_sk)       aggregated_fact,
         tpcds.household_demographics,
         tpcds.store,
         tpcds.date_dim,
         tpcds.customer_address
WHERE    store.s_city IN ( 'Midway', 'Concord', 'Spring Hill', 'Brownsville',
                           'Greenville' )
         AND date_dim.d_year IN ( 1999, 1999 + 1, 1999 + 2 )
         AND date_dim.d_dow IN ( 6, 0 )
         AND ( household_demographics.hd_dep_count = 5
                     OR household_demographics.hd_vehicle_count = 3 )
         AND ss_addr_sk = customer_address.ca_address_sk
         AND 'store_sales.ss_hdemo_sk' = household_demographics.hd_demo_sk
         AND 'store_sales.ss_store_sk' = store.s_store_sk
         AND 'store_sales.ss_sold_date_sk' = date_dim.d_date_sk
GROUP    BY ss_ticket_number,
         ss_customer_sk,
         ss_addr_sk,
         ca_city
```

```
SELECT   Sum_final('sum_partial(m1)') 'sum(m1)',
         dim1.c2                                   c2,
         dim1.c3                                   c3
FROM     stardb.dim1,
         (SELECT Sum_partial(m1) 'sum_partial(m1)',
                    f1              f1
         FROM       stardb.fact
         GROUP      BY f1) aggregated_fact_—
WHERE    f1 = pk1
GROUP    BY 2,
         3
```

In the two examples above, the analytical views almost suggest themselves. The analytical view definitions are the sub-selects that aggregate the fact tables. Note that these Aggregates, such as average, number of distinct values, and standard deviation cannot be broken up. These are known as non-decomposable aggregates. The solution is to compute the partial values of the aggregates and store enough information to be able to finalize or combine the partials later. Analytical views always store partials for this very reason. Therefore, the eager aggregation rewrite transforms the query to handle non-decomposable aggregations correctly. The simple star query then looks as follows.

views can be built incrementally when data in the underlying table changes. The definitions are shown below. For the simple stare schema we have the following.

```
CREATE analytical VIEW agg_fact_av stored AS parquet
AS SELECT  f1,
              Sum(m1) as my_sum
FROM          fact GROUP BY 1;
```

For the TPC-DC schema this results in the following.

```
create analytical view yyy stored as parquet as SELECT
ss_ticket_number                    ss_ticket_number,
        ss_customer_sk              ss_customer_sk,
        ss_addr_sk                  ss_addr_sk,
        Sum(ss_coupon_amt)          'sum(ss_coupon_amt)',
        Sum(ss_net_profit)          'sum(ss_net_profit)',
        store_sales.ss_sold_date_sk 'store_sales.ss_sold_date_sk',
        store_sales.ss_store_sk         'store_sales.ss_store_sk',
        store_sales.ss_hdemo_sk         'store_sales.ss_hdemo_sk'
FROM    tpcds.store_sales
GROUP   BY ss_ticket_number,
            ss_customer_sk,
            ss_addr_sk,
            store_sales.ss_sold_date_sk,
            store_sales.ss_store_sk,
            store_sales.ss_hdemo_sk
SELECT  Sum_final('sum_partial(m1)') 'sum(m1)',
        dim1.c2                                  c2,
        dim1.c3                                  c3
FROM    stardb.dim1,
        (SELECT Sum_partial(my_sum)  'sum_partial(m1)',
                        f1           f1
            FROM        stardb.agg_fact_av
            GROUP       BY f1) aggregated_fact__
WHERE   f1 = pk1
GROUP   BY 2,
            3
```

The query statement after analytical view substitution is as follows.

Observe how the inner select shows that analytical view substitution re-groups the data and finalizes the aggregates. This brings back the problem of combining finalized aggregates. The results would be wrong if the aggregate above was a non-decomposable aggregate. The solution is for the analytical view matching and substitution infrastructure to not regroup and finalize in this case. Then the statement look as follows.

```
SELECT  Sum_final ('sum_partial(m1)') 'sum(m1)',
        dim1.c2                                   c2
        dim1.c3                                   c3
FROM    stardb.dim1,
        (SELECT my_sum 'sum_partial(m1)',
                        f1           f1
            FROM        stardb.agg_fact_av) aggregated_fact__
WHERE   f1 = pk1
GROUP   BY 2,
            3
```

Now the inner select statement looks like a simple scan of the analytical view. Having the inner select like this prevents further optimizations. Therefore, the inner select needs to be merged back with the outer select. After the merge rewrite the statement looks as follows.

```
SELECT      Sum_final(my_sum) 'sum(m1)',
            dim1.c2                          c2,
            dim1.c3                          c3
FROM        stardb.dim1,
            stardb.agg_fact_av agg_fact_av
WHERE       f1 = pk1
GROUP       BY 2,
              3
```

Note how the final statement looks very similar to the original statement, except with the fact table reference table substituted by an analytical view and the query is changed to access the analytical view.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method comprising:
   identifying a star query that references a fact table and related dimension tables that characterize attributes of facts in the fact table;
   applying eager aggregation to a query plan associated with the star query, wherein the eager aggregation alters the query plan by moving an aggregation operation before a join operation to form an eager aggregated query plan;
   identifying an analytical view with data responsive to the eager aggregated query plan, wherein the analytical view includes attributes and measures maintained as a data unit separate from the distributed database, wherein the analytical view is constructed prior to receipt of the star query;
   revising the eager aggregated query plan to form a final query plan, wherein the final query plan references the analytical view; and
   executing the final query plan to produce query results.

2. The method of claim 1 further comprising:
   storing a partial function module to initialize a data dimension; and
   incrementing an aggregate of the database dimension in response to a data change and to serialize a last aggregate of the database dimension in response to a refresh operation to form partial results of an analytical view.

3. The method of claim 2 further comprising applying a merge rewrite to the eager aggregated query plan to merge together select blocks introduced by the eager aggregation.

4. The method of claim 1 wherein the analytical view comprises a subset of data from the fact table.

5. The method of claim 1 wherein the analytical view is used to expedite query processing and is computed by applying the join to the fact table.

6. The method of claim 5 wherein the eager aggregation reduces a number of input rows to the join to improve the query plan.

7. The method of claim 1 wherein the final query plan is executed by a plurality of worker machines coupled to a master machine through a network, wherein the plurality of worker machines store partitions of a distributed database.

8. The method of claim 7 wherein the master machine executes a query processor to perform the method.

9. The method of claim 7 further comprising securing the query results from the master machine in a client machine coupled to the master machine through the network.

10. A method comprising:
    executing a star query by reading individual tables and applying local filters to produce filtered tables;
    applying eager aggregation to the star query to form an eager aggregated query plan;
    identifying an analytical view with data responsive to the eager aggregated query plan, wherein the analytical view includes attributes and measures maintained as a data unit separate from the distributed database, wherein the analytical view is constructed prior to receipt of the star query;
    joining the filtered tables using join predicates; and
    revising the eager aggregated query plan to form a final query plan, wherein the final query plan references the analytical view.

11. The method of claim 10 wherein the final query plan is executed by a plurality of worker machines coupled to a master machine through a network, wherein the plurality of worker machines store partitions of a distributed database.

12. The method of claim 11 wherein the master machine executes a query processor to perform the method.

13. The method of claim 12 further comprising securing the query results from the master machine in a client machine coupled to the master machine through the network.

14. The method of claim 10 further comprising:
    storing a partial function module to initialize a data dimension; and
    incrementing an aggregate of the database dimension in response to a data change and to serialize a last aggregate of the database dimension in response to a refresh operation to form partial results of an analytical view.

15. The method of claim 14 further comprising applying a merge rewrite to the eager aggregated query plan to merge together select blocks introduced by the eager aggregation.

16. The method of claim 10 wherein the analytical view comprises a subset of data from the fact table.

17. A system comprising:
    a master machine configured to
        identify a star query that references a fact table and related dimension tables that characterize attributes of facts in the fact table,
        apply eager aggregation to a query plan associated with the star query, wherein the eager aggregation alters the query plan by moving an aggregation operation before a join operation to form an eager aggregated query plan,
        identify an analytical view with data responsive to the eager aggregated query plan, wherein the analytical view includes attributes and measures maintained as a data unit separate from the distributed database, wherein the analytical view is constructed prior to receipt of the star query,
        revise the eager aggregated query plan to form a final query plan, wherein the final query plan references the analytical view, and
        executing the final query plan to produce query results; and
    a client machine coupled to the master machine over a network, and configured to secure the query results from the master machine.

18. The system of claim 17 further comprising worker machines coupled to the network and configured to store partitions of a distributed database processed by the master machine.

19. The system of claim 18 wherein the master machine is further configured to
    store a partial function module to initialize a data dimension, and
    increment an aggregate of the database dimension in response to a data change and to serialize a last aggregate of the database dimension in response to a refresh operation to form partial results of an analytical view, and
    merge partial results from the worker machines.

20. The system of claim 19 wherein the master machine is further configured to apply a merge rewrite to the eager aggregated query plan.

* * * * *